United States Patent
Stieglitz

(10) Patent No.: US 7,614,078 B1
(45) Date of Patent: Nov. 3, 2009

(54) THRESHOLD ACCESS BASED UPON STORED CREDENTIALS

(75) Inventor: Jeremy Stieglitz, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 10/406,342

(22) Filed: Apr. 2, 2003

(51) Int. Cl.
*G09F 7/04* (2006.01)
*G06F 17/30* (2006.01)
*H04L 9/32* (2006.01)

(52) U.S. Cl. .......................... 726/2; 380/247; 380/248; 380/249; 380/250; 707/9; 711/147; 713/155; 713/156; 713/157; 713/158; 713/159; 709/225

(58) Field of Classification Search ............ 726/1, 726/2
See application file for complete search history.

(56) References Cited

U.S. PATENT DOCUMENTS

| | | | | |
|---|---|---|---|---|
| 6,070,244 | A * | 5/2000 | Orchier et al. | 726/1 |
| 6,141,778 | A * | 10/2000 | Kane et al. | 726/4 |
| 6,189,104 | B1 * | 2/2001 | Leppek | 726/1 |
| 6,314,425 | B1 * | 11/2001 | Serbinis et al. | 707/10 |
| 6,487,600 | B1 * | 11/2002 | Lynch | 709/229 |
| 6,611,881 | B1 * | 8/2003 | Gottfurcht et al. | 710/18 |
| 6,823,401 | B2 * | 11/2004 | Feather et al. | 710/18 |
| 6,986,161 | B2 * | 1/2006 | Billhartz | 726/23 |
| 7,032,241 | B1 * | 4/2006 | Venkatachary et al. | 726/4 |
| 7,243,369 | B2 * | 7/2007 | Bhat et al. | 726/6 |
| 2003/0154406 | A1 * | 8/2003 | Honarvar et al. | 713/201 |

OTHER PUBLICATIONS

Cisco Systems, Inc., "CiscoSecure ACS 3.0 for Windows 2000/NT Servers User Guide," Nov. 2001, pp. 1-654 (text provided on CD-ROM).
Sami Levijoki, "Authentication, Authorization and Accounting in Ad Hoc networks," May 26, 2000, http://www.tml.fi/Opinnot/Tik-110.551/papers/authentication/aaa.htm, printed Jun. 22, 2003, pp. 1-20.
D. Gustafson, et al., "Securely Available Credentials—Credentials Server Framework," Internet Draft, Sep. 2002, http://www.ietf.org/internet-drafts/draft-ietf-sacred-framwork-05.txt, printed Jun. 22, 2003, pp. 1-20.

(Continued)

*Primary Examiner*—Kambiz Zand
*Assistant Examiner*—Farid Homayounmehr
(74) *Attorney, Agent, or Firm*—Hickman Palermo Truong & Becker LLP

(57) ABSTRACT

A method and apparatus for authorizing an access requester to access a data communication network is provided. A determination is made that a threshold access control server cannot process an access request associated with the access requester. Access requester history data, or data that describes the access history for an access requester, is analyzed to obtain a threshold access level. A threshold access level is an expression of how likely that a particular access requester is a legitimate access requester. A session profile is selected for the access requester based on the threshold access level. The session profile indicates one or more actions the access requester is authorized to perform in the network. The session profile may subsequently be transmitted to the access requester to allow the access requester access to the network to the extent appropriate in view of the access requester history data.

33 Claims, 6 Drawing Sheets

OTHER PUBLICATIONS

H. Anderson, et al., "Protected EAP Protocol (PEAP)," PPPEXT Working Group, Internet-Draft, Feb. 23, 2002, http:///www.globecom.net/ietf/draft/draft-josefsson-pppext-eap-tls-eap-02.html, printed Apr. 16, 2003, pp. 1-43.

L. Blunk, et al., "PPP Extensible Authentication Protocol (EAP)," Mar. 1998, Network Working Group, Request for Comments: 2284, pp. 1-15.

Security First Corp., "TrustEngine™ White Paper," Jun. 2002, pp. 1-9.

* cited by examiner

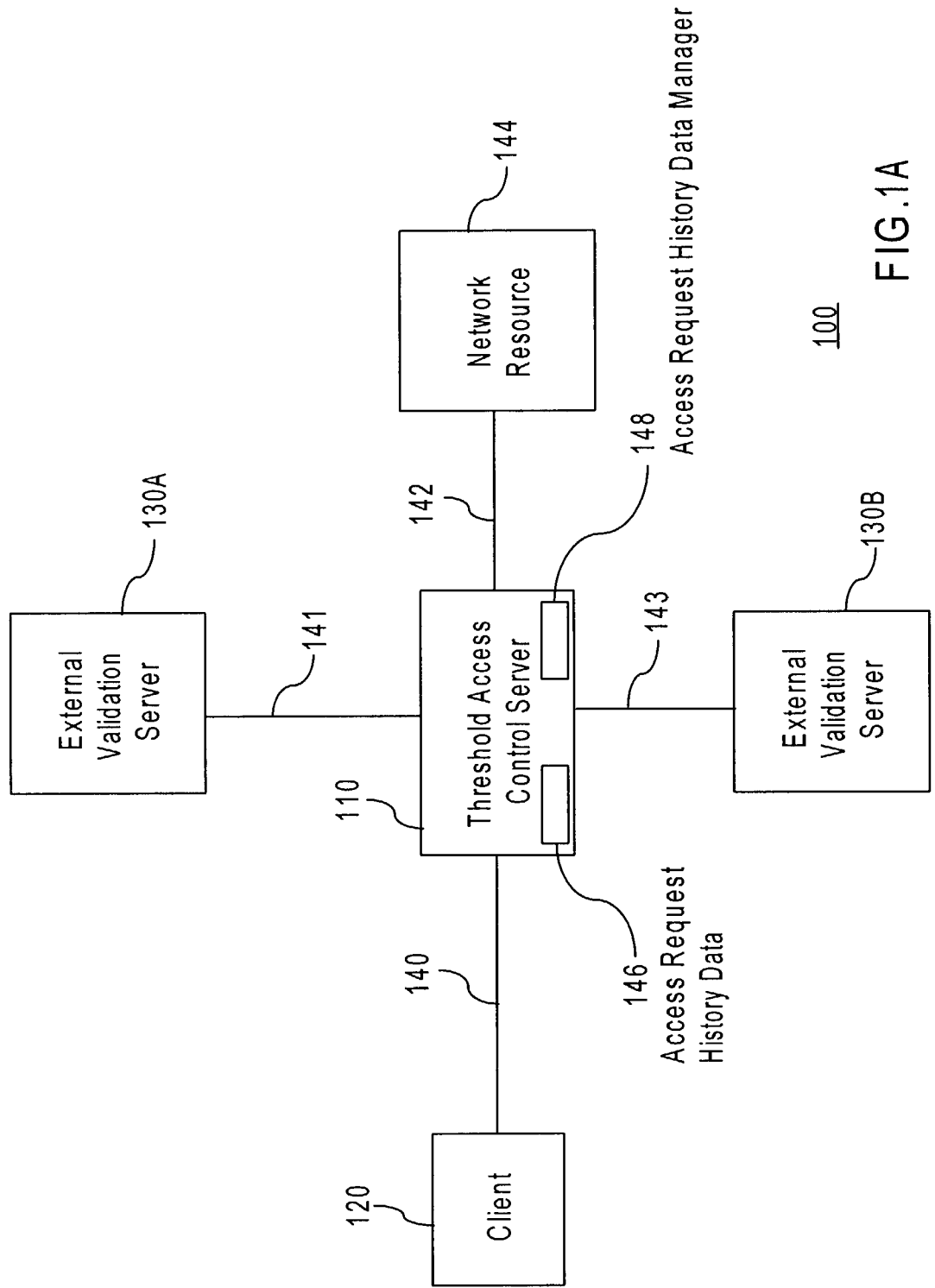

THRESHOLD ACCESS BASED UPON STORED CREDENTIALS

FIELD OF THE INVENTION

The present invention generally relates to providing access to requesters of network resources. The invention more particularly relates to providing threshold network access to requesters of network resources based upon historical analysis of stored credentials.

BACKGROUND OF THE INVENTION

Access control servers, as broadly used herein, provide the ability to block illegitimate access requests for computer network resources, while providing legitimate requesters the appropriate access to network resources. Access control servers may respond to access requests from users, devices (such as routers, firewalls, access points, and dial gateways) and processes that request access to network resources. As broadly used herein, the term 'access requester' shall be used to describe any entity that issues an access request that may be serviced by an access control server. As broadly used herein, the term 'access request' shall be used to describe any request for a network resource, including a user transit session or a request to perform administration changes to a device. An access request may span several discrete network connections, devices, software servers, and in general, must be available and operational for a successful access request. A commercial example of an access server is Cisco Secure Access Control Server 3.0, available from Cisco Systems, Inc. of San Jose, Calif.

Access control servers perform authentication, authorization, and accounting for access requesters. Initially, in processing an access request, an access control server authenticates the access request. Authentication is the validation of credentials presented by the access requester. Next, the access control server typically authorizes the access requester. Authorization is the determination of what actions the access requester is permitted to perform. After an access requester has been authorized, an access control server may transmit information, called a session profile, which provisions various network session attributes and indicates the set of allowable actions that the access requester may perform. Examples of session profile attributes include rate limiting and quota restrictions, MPLS and VRF tunneling, VLAN and SSID segmentations, security and dynamic Access Control Lists (ACLs), security settings for IPSec or SSL tunnel establishment, and QOS parameters. Thereafter, the access control server performs accounting functionality for the access requester. Accounting is the creating and storing of records that describe what actions the access requester has performed.

In authenticating access requesters, access control servers may use a variety of different types of credentials. As used herein, a credential is any evidence that may be used by an access control server to accurately identify the identity or status of the access requester associated with the credential. A credential may be, although it need not be, a set of information stored electronically. A credential may include, e.g., a usernames and password combination, a single-use token password that is uniquely generated every minute, public and private keys as used in public key encryption, etc. An access control server may also perform authentication using a biometric credential, which is evidence that identifies a set of personally unique physical characteristics for a person, such as a fingerprint, a voice pattern, or a retinal scan.

In performing authentication, the access control server may either validate the requester's credentials locally, or the access control server may consult one or more external entities ("an external validation server") to assist in the authentication of the access requester's credentials. For example, a particular access control server may consult with an external validation server to validate a person's username and password combination. An LDAP directory server or similar repository is an example of an external validation server.

Additionally, even if the access control server performs authentication locally, in the authentication step the access control server may consult one or more external validation servers in the performance of additional access or security functionality, e.g., to perform a determination that the access request from the access requester does not contain any computer viruses. In this fashion, even if the access requester's credentials are authenticated locally to the access control server, the access control server may still need to reach one or more external validation servers to authenticate the access requester.

Unfortunately, however, occasionally the external validation server may become inaccessible to the access control server. The external validation server may become inaccessible for a variety of reasons, e.g., problems with the external validation server or the network connection between the external validation server and the access control server. When the external validation server becomes inaccessible, then the access control server is unable to authenticate any credentials normally handled by the inaccessible external validation server. As the access control server is unable to authenticate the access requester's credentials, the access control server must deny access to the access requester. This is undesirable and can be a source of user frustration and unnecessary network downtime.

Similarly, occasionally the access control server itself may become inaccessible to a client of the access control server. The access control server may become inaccessible for a variety of reasons, e.g., problems with the access control server or the network connection between the access control server and the client. As the access control server is unable to authenticate the access requester's credentials, the access requester associated with the client is unable to gain access to the desired network resources because the access control server was unable to provide the required session profile to the client.

If an access requester's request is denied, the access requester is typically completely denied access; in other words, since the access control server may respond to an access request only by either completely granting the desired access or completely denying the access request, any problem the access control server encounters that prevents the granting of the access request results in complete denial of the access request.

Some access control servers, however, may issue "guest status" to certain access requesters, instead of completely denying their access request when problems reaching an external validation server arise, by providing the access requester with a default session profile that allows the access requester to access a scope of network resources commensurate with a "guest." However, this is far from a satisfactory solution, because the scope of the access to network resources afforded to guests is traditionally relatively small and restricted to non-essential network resources, otherwise the security of the network may be compromised. Restricting the scope of access afforded to guests is necessary to maintain control over who is accessing network resources. As a result, if a legitimate access requester is denied access and merely granted guest status, typically the access requester is prohibited from performing the tasks on the network that the legitimate access requester would like to perform.

To avoid the undesirable implications of denying access to legitimate access requesters, some access control servers may use a form of caching. When either the access control server or a required external validation server is inaccessible, a session profile that is stored in a cache at the client of the access control server (when the access control server is inaccessible) or stored in the cache at the access control server (when a required external validation server is inaccessible) may be used.

This approach of using a simple cache to supply the session profile is problematic because caches, by their very nature, are not as secure as a centralized access control server, which may be deployed securely within the network. Additionally, the distribution of valid session profiles to a variety of locations increases the security risk to the network because control over the session profiles is decreased. Any latency between the removal of user account access provided by the access control server and the removal of access in each of the distributed caches raises an additional security risk that illegitimate access can be obtained. Moreover, blind reliance on the existence of a session profile in a cache may introduce unacceptable risk to the security of the network.

Since denying access to legitimate access requesters is clearly an undesirable result, it is desirable to improve the ability of an access control server to grant access to legitimate access requesters in balance with the concern of preventing illegitimate access requesters entry to the network and access to network resources. Currently, however, there is no effective mechanism for doing so.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates the functional components of a threshold access system according to an embodiment;

DETAILED DESCRIPTION OF THE INVENTION

Figure 1B:
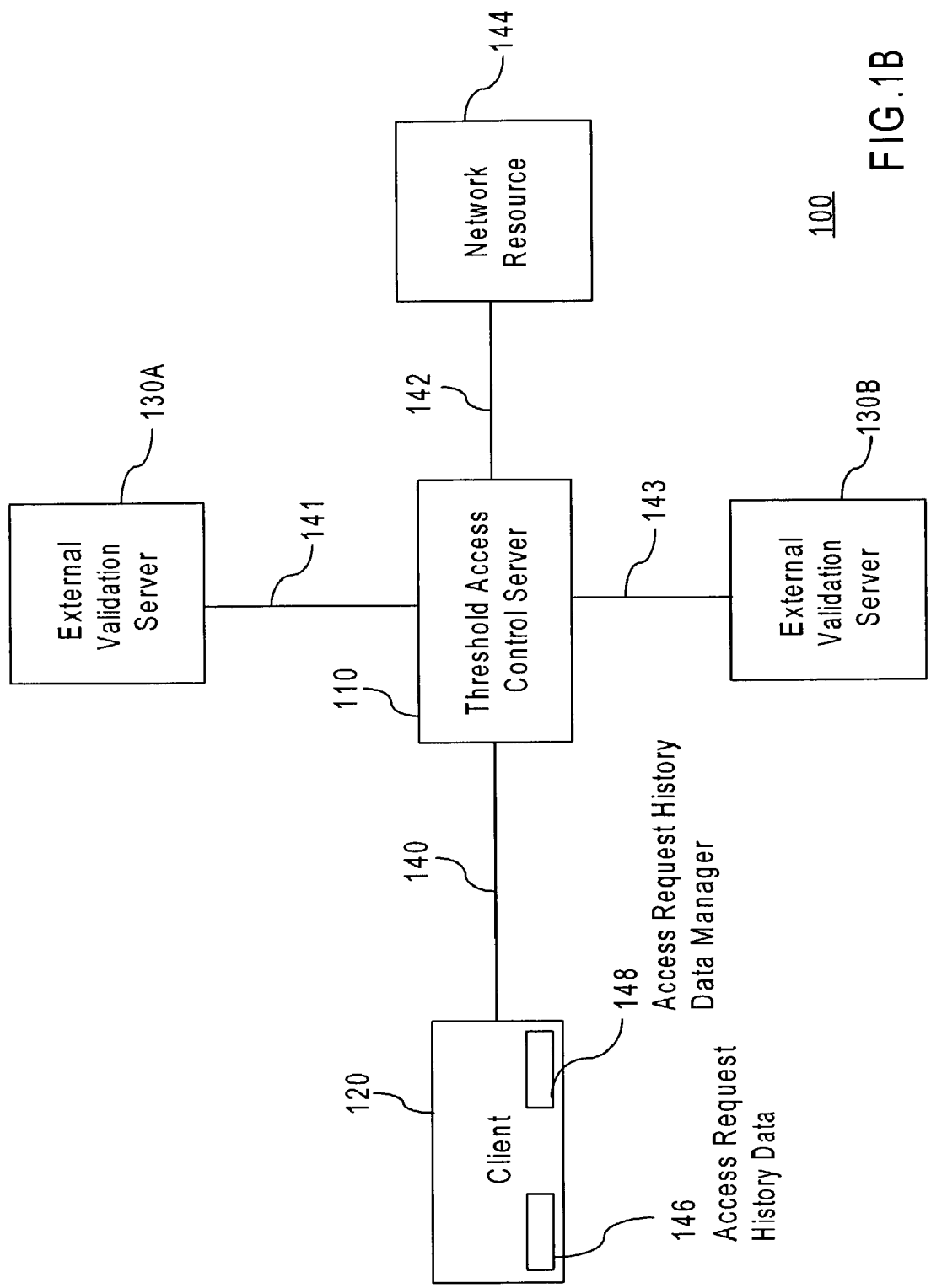
FIG. 1B is a block diagram that illustrates the functional components of a threshold access system according to another embodiment.

A method and apparatus for authorizing a user to access a data communication network is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Various aspects of the invention are described hereinafter in the following sections:
I. Architecture Overview
II. Functional Overview
III. Authorizing an Access Requester Using Threshold Access
IV. Implementing Mechanisms
I. Architecture Overview FIG. 1A is a block diagram that illustrates the functional components of a threshold access control system 100. Threshold access control system 100 may be used to provide threshold access based upon stored credentials. Threshold access, in this context, is used to mean access to network resources at some level between none and full that is in accordance with configurable security policies given to a stored credential. In an embodiment, the threshold access control system 100 includes a threshold access control server 110, a client 120, external validation server 130A, 130B, communication links 140, 141, 142, and 143, and network resource 144.

Figure 2:
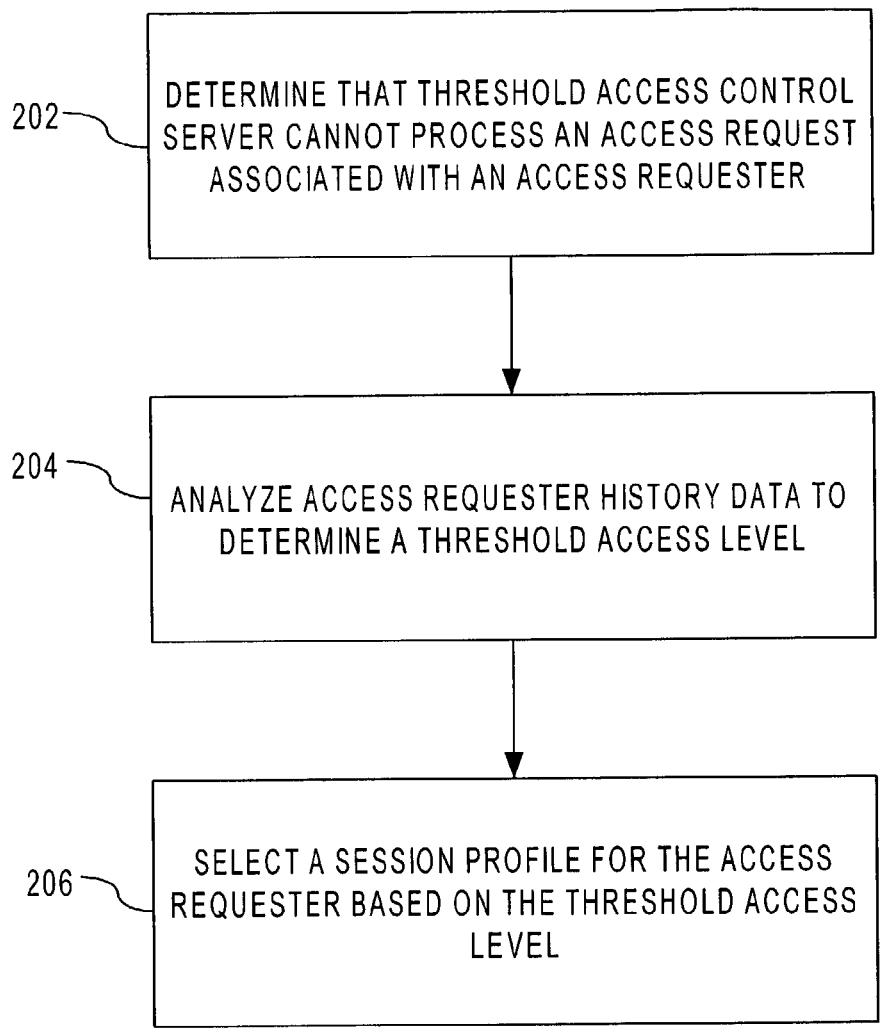
FIG. 2 is a flow-chart that depicts the high-level functional steps of authorizing a user to access a data communication network.

Threshold access control server 110 is any access control server capable of performing the functional steps illustrated in FIG. 2. Access control servers provide the ability to advantageously block illegitimate access requests for network resource 144, while providing legitimate requesters the appropriate access to network resource 144. In an embodiment, threshold access control server 110 is configured with one or more hardware or software elements to provide threshold access to access requesters as described herein.

Client 120 is any functional component capable of issuing an access request to threshold access control server 110. For example, client 120 may be an access router, firewall, PC, workstation, etc. A client 120 may be implemented in hardware or software, and client 120 may service one or more other clients. While only one client 120 is shown in FIG. 1, for purposes of illustrating a simple example, threshold access control system 100 may comprise any number of clients 120.

One or more access requesters may be associated with client 120. For example, if client 120 is embodied in a web browser, then multiple individuals may use the web browser to issue access requests. Client 120 may also, itself, be an access requestor. For example, if client 120 is a computerized device configured to request access, then client 120 is also the access requester. For ease of explanation in the following description, a single access requester shall be assumed to be associated with client 120, wherein the access requester issues an access request through client 120 to threshold access control server 110.

External Validation Server 130 is any server that is accessible by threshold access control server 110, and assists threshold access control server 110 in validation of credentials or in performance of access or security functionality. For example, external validation server 130A may be configured to assist threshold access control server 110 with the validation of credentials, external validation server 130B may be configured to assist threshold access control server 110 by verifying that an access requester has installed or is using a virus checker, and external validation server 130C may be configured to assist threshold access control server 110 by verifying that an access request originates from a legitimate client 120. While external validations server 130A, 130B are shown in FIG. 1, it should be understood to those in the art that threshold access control system 100 may comprise any number of external validations servers 130.

Communication links 140-143 may be implemented by any medium or mechanism that provides for the exchange of data between threshold access control server 110, client 120, and external validation server 130A-C. Examples of communications links 140-143 include, without limitation, a network such as a Local Area Network (LAN), Wide Area Network (WAN), Ethernet or the Internet, or one or more terrestrial, satellite or wireless links. Communication links 140-143 may employ a variety of authentication protocols, such as, e.g., PAP, RADIUS, LDAP, CHAP, and NIS.

II. Functional Overview

FIG. 2 is a flow-chart 200 that depicts the high-level functional steps of authorizing an access requester to access a data communication network.

In step 202, a determination is made that the threshold access control server cannot process an access request associated with the access requester. For example, the determination of block 202 may occur when the external validation server is unavailable or unreachable. As a result, the threshold access control server attempts an alternative processing approach. In step 204, access requester history data is analyzed to determine a threshold access level. Access requestor history data may comprise data stored by the threshold access control server and relating to prior successful accesses of the same access requestor to the same or similar network resources. In step 206, a session profile is selected for the access requester based on the threshold access level. The session profile indicates one or more actions the access requester is authorized to perform in the network. The session profile may be stored in any appropriate repository with other profiles.

III. Authorizing an Access Requester Using Threshold Access

Figure 3:
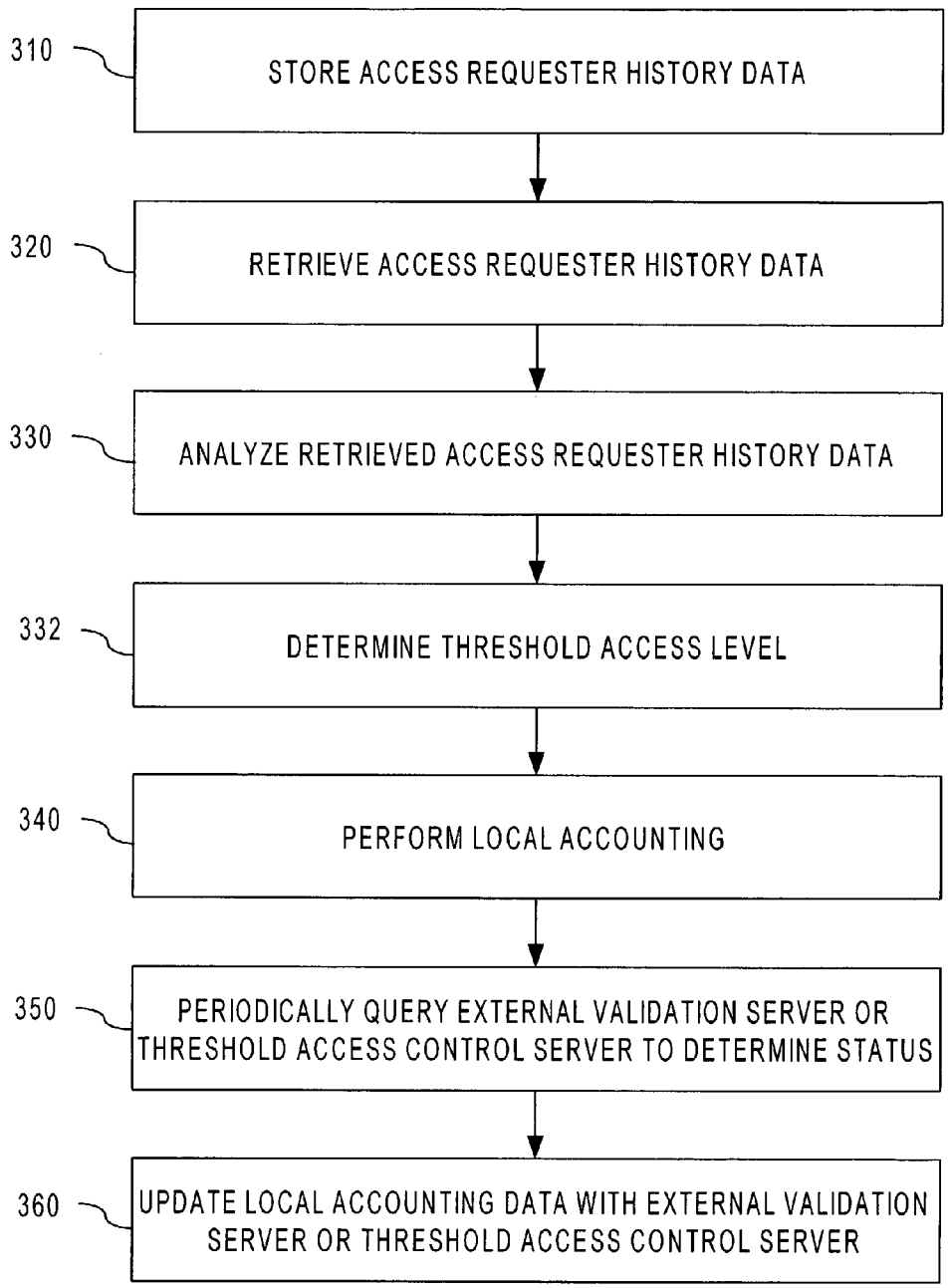
FIG. 3 is a flow-chart that depicts the steps of authorizing an access requester at threshold access control server using threshold access.

Authorizing an access requester using threshold access is now described in further detail with reference to flow-chart 300 of FIG. 3. In an embodiment, the steps described in flow-chart 300 may be performed at threshold access control server 110. Such an embodiment is advantageous when threshold access control server 110 is unable to communicate with external validation server 130. In another embodiment, the steps described in flow-chart 300 may be performed at client 120. Such an embodiment is advantageous when client 120 is unable to communicate with threshold access control server 110.

In step 310, access requester history data is stored and maintained. Access requester history data is data that describes the access history for an access requester. For example, each access requester of threshold access control server 110 may have a unique set of access requester history data 146 that describes prior access actions for that particular access requester. Access requester history data 146 may be stored in a non-volatile storage medium at threshold access control server 110, as depicted in FIG. 1A. Access requester history data 146 may be stored in a non-volatile storage medium at client 120, as depicted in FIG. 1B.

Access requester history data may include any type of information that describes the access history for an access requester. For example, access requester history data may include, although it need not include, information about one or more of the following:

1. The location of validation of one or more prior access requests, i.e., whether a credential associated with the access request is validated at the access control server or at an external validation server.
2. The frequency of receiving access requests from the access requester.
3. The length of time since the last successful access request from the access requester.
4. The length of time that an account associated with the access requester has existed.
5. The type of credential associated with the access request.
6. A group membership associated with the access requester.
7. A MAC address or other unique identifier associated with the access request.
8. Credentials not related to the identity, but the status, of the access requester. For example, the status credential could verify, for a device associated with the assess requester, a machine type of the device, whether a particular virus checker is installed, etc.
9. Information about any prior unsuccessful access requests.
10. Information about previous authorization rules, e.g., group memberships, user or group "roles," and previous quota or session provisioning restrictions.

Access requester history data may be recorded in real time contemporaneously with the occurrence of the activity by the access requester.

An administrator of threshold access control system 100 may employ an access requester history data manager 148 to manage the access requester history data. In an embodiment, the access requester history data manager 148 provides an interface through which the administrator may perform functions of managing the access requester history data 146, viewing the access requester history data, purging and/or deleting access requester history data, importing access requester history data, replicating access requester history data, and achieving the access requester history data. Access requester history data manager 148 is located locally to the access request history data 146; consequently, access requester history data manager 148 may be located at threshold access control server 110, as depicted in FIG. 1A, or located at client 120, as depicted in FIG. 1B.

The administrator may use the access requester history data manager 148 to import access requester history data 146 to the location where it is being stored. The imported access requester history data may describe activity for the access requester prior to the importation. In this fashion, the administrator may create any desired state of access requester history data for an access requester without requiring the access requester to perform the particular set of activities described in the imported access requester history data. For example, if the access requester is a newly hired CEO of a company, the administrator may configure the CEO's access requester history data 146 to indicate a high level of trust, even if activities described in the access requester history data 146 that give rise to the high level of trust never occurred. Thus, access requester history data 146 may include one or more synthetic records.

The administrator may also use the access requester history data manager 148 to access and configure configuration data that describes the operation of the access requester history data manager. In particular, the administrator may configure the access requester history data manager 148, using the configuration data, to perform functionality according to the rules or instructions configured in the configuration data. In such a way, the administrator may configure the configuration data such that the access requester history data manager 148 may perform scheduled tasks, e.g., periodic purging of access requester history data or periodic archival of the access requester history data 146, or to establish TTL (time to live parameters) for any particular element of the access requester history file 146.

In step 320, in response to determining that threshold access control server 110 or external validation server 130 is unable to process an access request from an access requester, access requester history data 146 is retrieved. External validation server 130 may be unable to process an access request for a variety of reasons, e.g., a problem with processing the access request arising internally to access control server 110. Threshold access control server 110 may be unable to process an access request for a variety of reasons, e.g., a problem with processing the access request arising internally to access control server 110 or a problem with an external validation server 130 that is required to assist threshold access control server 110 in processing the access request.

While access requester history data may be stored for many access requesters, only the access requester history data for the access requester whose access request is unable to be processed is retrieved in step 320.

In steps 330, the retrieved access requester history data 146 is analyzed to obtain a threshold access level for the access requester. A threshold access level is an expression of how likely that a particular access requester is a legitimate access requester. A threshold access level may be based upon the business and security policies of threshold access control server 110. Embodiments of the invention may employ threshold access levels that not only express how likely that a particular access requester is a legitimate access requester, but more particularly express how likely that the alleged identity of a particular access requester is the correct identity of the particular access requester. The analysis performed in determining the threshold access level includes considering how likely the access request is from the purported access requester based upon the access requester history data.

Figure 4:
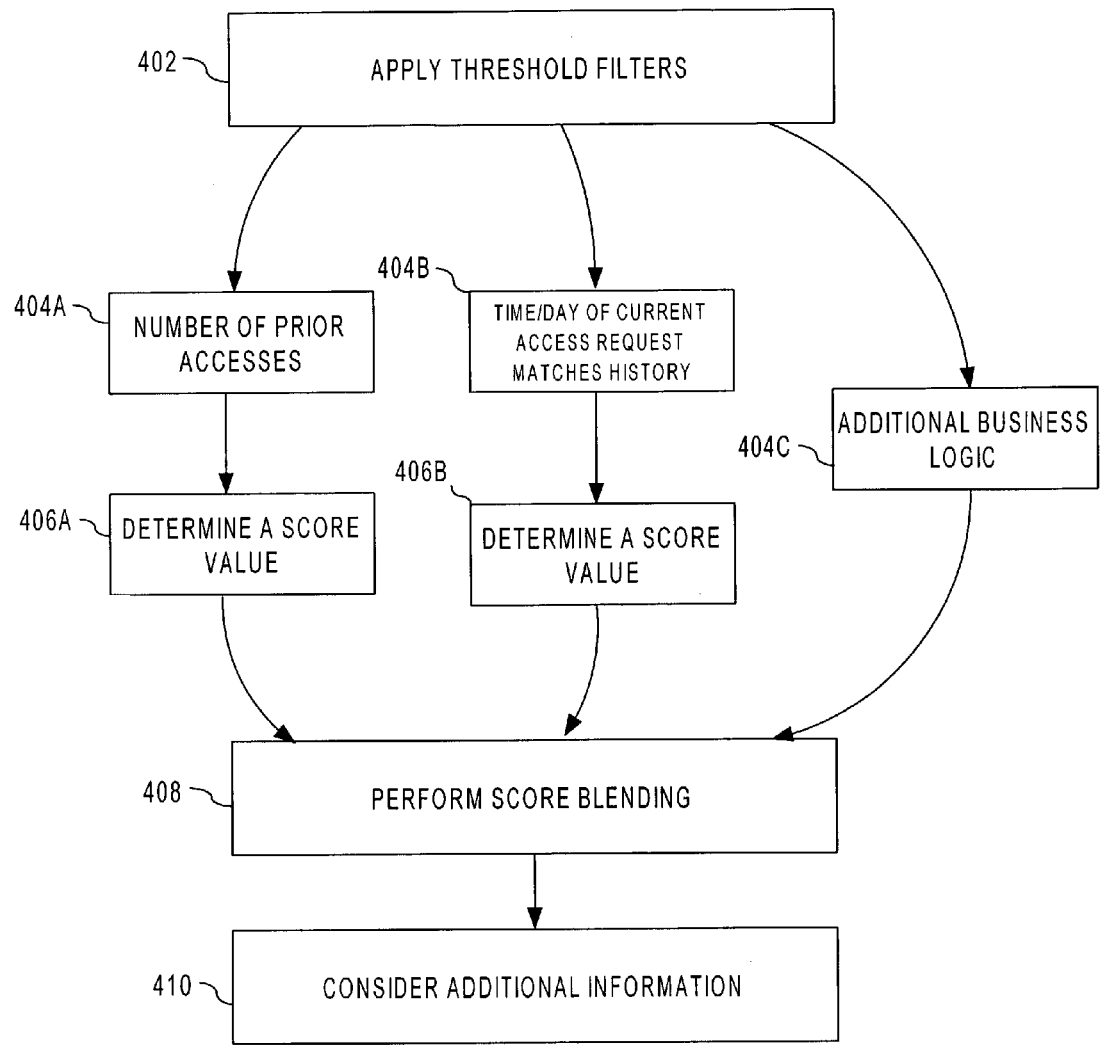
FIG. 4 is a flow-chart that depicts the steps of determining the threshold access level.

FIG. 4 is a flow-chart 400 illustrating the functional steps of performing step 330 according to an embodiment. In step 402, one or more threshold filters are applied to the access requester history data for purposes of determining a threshold access level. A threshold filter is a configurable rule used to interpret access requester history data to gauge how much trust should be given to the access requester associated with the access requester history data. The one or more threshold filters embody business logic to balance the benefit of granting access to legitimate access requesters against the concern of granting access to illegitimate access requesters when an access request is not able to be processed as usual.

Threshold filters may be used to consider any number of configurable rules used to interpret access requester history data. For example, in step 404A, a threshold filter may consider how many previous successful access requests are described by the access requester history data. In such a case, an access requester may obtain a threshold access level with a greater degree of trust if the access requester has had a long history of successful access requests. Further, a threshold filter may detect variances from an established pattern of access. For example, in step 404B, if the access requester history data indicates that the access requester has always requested access only during the daytime on Monday-Friday, then an access requester may obtain a threshold access level with a lesser degree of trust if the access requester issues the access request during the weekend or at night. In step 404C, additional business logic may be applied using one or more threshold filters, e.g., threshold access level with a greater degree of trust may be obtained for an access requester who has previously successfully obtained access using a smart card or biometric credential, because those types of credentials are more difficult to forge than a username/password credential. Steps 404A, 404B, and 404C are non-limiting examples of a threshold filter that may be applied. Accordingly, the one or more threshold filters applied to the access requester history data 146 may include any number of steps 404A, 404B, and 404C, as well as any other potential threshold filter.

The threshold filters that are applied to the access requester history data in obtaining a threshold access level may be arbitrarily complex in their operation and number. For example, a particular threshold filter may determine the threshold access level, or the particular threshold filter may merely add a configurable amount of weight towards the level of trust expressed by the threshold access level.

In an embodiment wherein threshold filters add a configurable amount of weight towards the level of trust expressed by the threshold access level, the application of a particular threshold filter may yield a certain weighted score value, which may be positive or negative, after analyzing the access requester history data, such as illustrated in steps 406A and 406B. In step 408, the threshold access level is calculated by blending all the values associated with each threshold filters. Other embodiments may use similar weighted factors to measure the result of applying the threshold filters to the access requester history data to obtain the threshold access level.

In step 410, additional information may be considered in determining the threshold access level. In an embodiment, as part of access requestor history data evaluation performed in step 330 the access requester may be queried in real time to supply additional information for use in determining the threshold access level. The additional information obtained from the access requester may be directed towards any subject that would assist the process of determining the threshold access level, including information directed towards authentication or access control. Such an embodiment may be advantageous when analyzing the access requester history data does not yield a threshold access level with sufficient clarity or confidence. For example, an access requester may be queried for additional information, such as his or her mother's maiden name, or other identifying information or credentials known to the access requester but not to the general public. One or more threshold filters may be used to analyze the additional information, along with the access requester history data, to determine the threshold access level.

Once a threshold access level is determined, in step 332, a session profile is selected based on the threshold access level. A session profile is a profile associated with an access requester that indicates one or more actions that the access requester is authorized to perform in the network. For example, a session profile may provision any number of parameters of a particular network session. The session profile provides threshold access to the access requester in accordance with the access requester's past behavior. Selection in step 332 may involve a table lookup or mapping, e.g., the access requester has threshold access level 22, which corresponds to the network session attributes of VLAN 10, ACL Marketing, and a session length of 2 hours.

The session profile may limit the access requester's action on the network to an extent commensurate with the access requester history data. The session profile may limit the access granted to the access requester based upon the level of trust afforded to the access requester expressed in the threshold access level. For example, the session profile may provide a more limited access connection to the access requester such that access is only granted for a period of minutes or hours, only certain network resources are available to the access requester, quota and/or rate limiting restrictions are provided to limit network resource consumption by the access requester, and a limited service connection is provided using Quality of Service (QOS) when using a session profile based upon a threshold access level.

In an embodiment, the session profile is selection by mapping the threshold access level to obtain the session profile for the access requester. For example, the threshold access level may be mapped to a table of session profiles to determine the session profile. A set of threshold access levels may map to the same session profile.

Once the session profile is selected, the session profile may be transmitted or made available to client 120 associated with the access requester. For example, the session profile may be transmitted over communication link 140 to client 120 if the session profile is determined in step 320 at threshold access server 110. Once the session profile is received by client 120, the access requester is authorized to perform any action authorized by the session profile.

In step 340, local accounting is performed. Local accounting involves recording information about the activity performed by the access requester, such as, e.g., the session profile assigned to the access requester in step 330, information about any unsuccessful access requests made by the access requester, and information about network resources accessed by the access requester. Thus, the local accounting of step 340 may record information about the activity of an access requester prior to any successful access request, as well as information about the activity of an access requester during and subsequent to any successful access request. The information about the activity performed by the access requester that is recorded in step 340 is called local accounting data.

Local accounting may be performed at any level of granularity. In an embodiment, local accounting data is collected and stored at a level of granularity commensurate with the level of granularity of the access requester history data. The local accounting of step 340 is performed locally to the access requester history data 146; consequently, local accounting may be performed at threshold access control server 110 or at client 120. Additionally, local accounting information may also be stored in access requester history data, thereby affecting future decisions based on the access requester history data.

In step 350, external validation server 130 or threshold access control server 110 is periodically queried to determine the status of external validation server 130 or threshold access control server 110, i.e., whether external validation server 130 or threshold access control server 110 is able or unable to process an access request from an access requester. The component (external validation server 130 or threshold access control server 110) queried in step 350 is the same component that was unable to process an access request in step 320. The amount of time between queries to external validation server 130 or threshold access control server 110 to determine its status may be configurable. The purpose of such queries is to enable threshold access control server 110 to being processing access requests using external validation servers as soon as possible if external validation server 130 was unable to process an access request in step 320, or to enable client 120 to successfully process an access request using threshold access control server 110 as soon as possible if threshold access control server 110 was unable to process an access request in step 320.

In step 360, local accounting data is updated. Specifically, (a) in response to determining that external validation server 130 is able to process an access request from an access requester, external validation server 130 is updated with the local accounting data, and (b) in response to determining that threshold access control server 110 is able to process an access request from an access requester, threshold access control server 110 is updated with the local accounting data. The determination that external validation server 130 or threshold access control server 110 is able to process an access request from an access requester may be based upon the status of external validation server 130 obtained in step 350A.

The functional steps described according to the embodiment depicted in flow-chart 300 have been described sequentially, but other embodiments may perform the steps described in flow-chart 300 in a different order, or in parallel with one another. Other steps described with reference to flow-chart 300 may be performed continuously. For example, steps 310, 340 and 350 each may be done over a continuous period in parallel with one another. Accordingly, embodiments are not limited any particular order of the functional steps illustrated in flow-chart 300.

IV. Implementation Mechanisms

Figure 5:
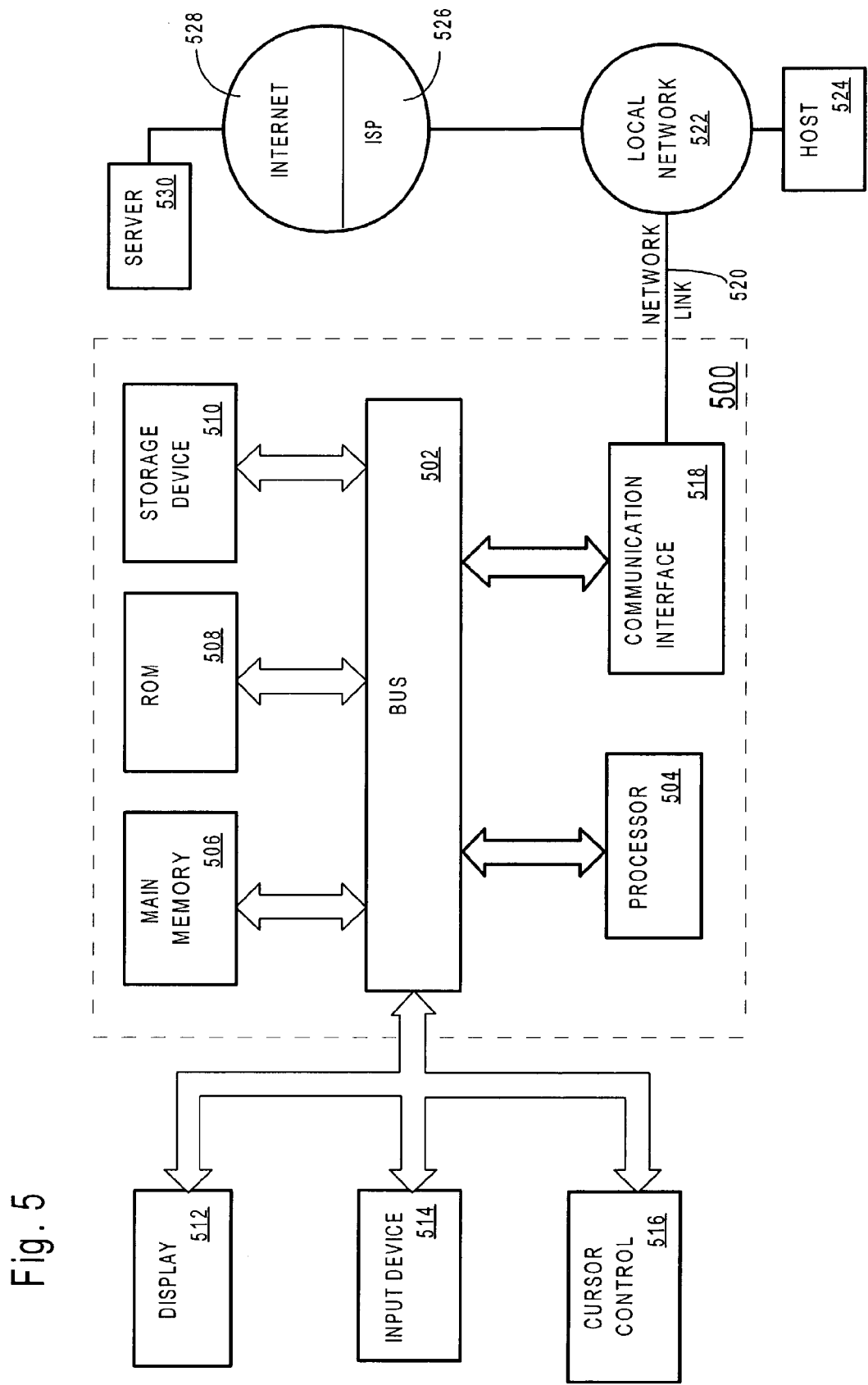
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

receiving, from an access requester that does not have access to a data communication network, a request to access the data communication network;

the access control server attempting to obtain assistance from an external validation server that normally handles one or more credentials used for authentication to process the request;

storing and maintaining, separate from the external validation server, access requester history data for the access requester, wherein the access requester history data comprises one or more of a location of validation of one or more prior access requests, a length of time since a last successful access request from the access requester, a length of time that an account associated with the access requester has existed, a type of credential associated with the access request, a group membership associated with the access requester, a MAC address or other unique identifier associated with the access request, or a status credential that represents a security configuration of a device associated with the assess requester;

determining that an access control server cannot process the access request associated with the access requester, wherein said determining that the access control server cannot process the access request includes failing to obtain the assistance from the external validation server; and in response to failing to obtain the assistance from the external validation server:

the access control server analyzing the access requester history data to determine a threshold access level for the access requester, wherein the access requester history data describes a history of attempts to access resources by a set of users, wherein the set of users includes the access requester, and wherein the threshold access level is an expression of how likely the access requester is a legitimate access requester;

the access control server selecting a session profile for the access requester based on the threshold access level for the access requester, wherein the session profile indicates one or more actions the access requester is authorized to perform in the network; and based on the session profile, the access control server authorizing, without accessing one or more external servers to authenticate the one or more credentials that are normally handled by the one or more external servers, the access requester to perform one or more actions in the network.

2. The method of claim 1, wherein analyzing the access requester history data includes applying one or more threshold filters to the access requester history data to result in determining the threshold access level.

3. The method of claim 1, wherein the session profile is selected by mapping the threshold access level to one or more stored session profiles for the access requester.

4. The method of claim 1, wherein the access requester history data identifies one or more prior unsuccessful access requests from the access requester.

5. The method of claim 1, further comprising:
prior to analyzing the access requester history data, storing the access requester history data, for the access requester, at a client of the access control server.

6. The method of claim 1, further comprising:
prior to analyzing the analyzing access requester history data, storing the access requester history data, for the access requester, at the access control server.

7. The method of claim 1, further comprising:
prior to analyzing the access requester history data, storing the access requester history data for the access requester, wherein the access requester history data is imported, and wherein the access requester history data describes activity for the access requester prior to the importation.

8. The method of claim 1, wherein selecting the session profile is performed by a client of the access control server.

9. The method of claim 1, further comprising:
requesting the access requester to supply additional authentication or access control information;
analyzing the additional authentication or access control information with the access requester history data to determine the threshold access level.

10. The method of claim 1, further comprising:
storing local accounting data that includes information about the session profile assigned to the access requester.

11. The method of claim 10, further comprising:
periodically querying the access control server to determine a status of the access control server until the status indicates that the access control server is able to process future access requests; and
in response to determining that the status indicates that the access control server is able to process future access requests, updating the access control server with the local accounting data.

12. An apparatus for authorizing an access requester to access a data communication network, comprising:
one or more processors; and
a machine-readable medium carrying one or more sequences of instructions, which when executed by the one or more processors, causes:
receiving, from an access requester that does not have access to a data communication network, a request to access the data communication network;
the access control server attempting to obtain assistance from an external validation server that normally handles one or more credentials used for authentication to process the request;
storing and maintaining, separate from the external validation server, access requester history data for the access requester, wherein the access requester history data comprises one or more of a location of validation of one or more prior access requests, a length of time since a last successful access request from the access requester, a length of time that an account associated with the access requester has existed, a type of credential associated with the access request, a group membership associated with the access requester, a MAC address or other unique identifier associated with the access request, or a status credential that represents a security configuration of a device associated with the assess requester;
determining that an access control server cannot process the access request associated with the access requester, wherein said determining that the access control server cannot process the access request includes failing to obtain the assistance from the external validation server; and
in response to failing to obtain the assistance from the external validation server:
the access control server analyzing access requester history data to determine a threshold access level for the access requester,
wherein the access requester history data describes a history of attempts to access resources by a set of users, wherein the set of users includes the access requester, and
wherein the threshold access level is an expression of how likely the access requester is a legitimate access requester;
the access control server selecting a session profile for the access requester based on the threshold access level for the access requester, wherein the session profile indicates one or more actions the access requester is authorized to perform in the network; and
based on the session profile, the access control server authorizing, without accessing one or more external servers to authenticate credentials that are normally handled by the one or more external servers, the access requester to perform one or more actions in the network.

13. The apparatus of claim 12, wherein analyzing the access requester history data includes applying one or more threshold filters to the access requester history data to result in determining the threshold access level.

14. The apparatus of claim 12, wherein the session profile is selected by mapping the threshold access level to one or more stored session profiles for the access requester.

15. The apparatus of claim 12, wherein the access requester history data identifies one or more prior unsuccessful access requests from the access requester.

16. The apparatus of claim 12, further comprising:
prior to analyzing the access requester history data, storing the access requester history data, for the access requester, at a client of the access control server.

17. The apparatus of claim 12, further comprising:
prior to analyzing the access requester history data, storing the access requester history data, for the access requester, at the access control server.

18. The apparatus of claim 12, further comprising:
prior to analyzing the access requester history data, storing the access requester history data for the access requester, wherein the access requester history data is imported, and wherein the access requester history data describes activity for the access requester prior to the importation.

19. The apparatus of claim 12, wherein selecting the session profile is performed by a client of the access control server.

20. The apparatus of claim 12, further comprising:
requesting the access requester to supply additional authentication or access control information;
analyzing the additional authentication or access control information with the access requester history data to determine the threshold access level.

21. The apparatus of claim 12, further comprising:
storing local accounting data that includes information about the session profile assigned to the access requester.

22. The apparatus of claim 12, further comprising:
periodically querying the access control server to determine a status of the access control server until the status indicates that the access control server is able to process future access requests; and
in response to determining that the status indicates that the access control server is able to process future access requests, updating the access control server with the local accounting data.

23. An apparatus for authorizing an access requester to access a data communication network, comprising:
means for receiving, from an access requester that does not have access to a data communication network, a request to access the data communication network;
means for the access control server attempting to obtain assistance from an external validation server that normally handles one or more credentials used for authentication to process the request;
means for storing and maintaining, separate from the external validation server, access requester history data for the access requester, wherein the access requester history data comprises one or more of a location of validation of one or more prior access requests, a length of time since a last successful access request from the access requester, a length of time that an account associated with the access requester has existed, a type of credential associated with the access request, a group membership associated with the access requester, a MAC address or other unique identifier associated with the access request, or a status credential that represents a security configuration of a device associated with the assess requester;
means for determining that an access control server cannot process the access request associated with the access requester, wherein said means for determining that the access control server cannot process the access request includes means for determining a failure to obtain the assistance from the external validation server;
means, responsive to the means for determining that the access control server cannot process the access request, for the access control server analyzing access requester history data to determine a threshold access level for the access requester,
wherein the access requester history data describes a history of attempts to access resources by a set of users, wherein the set of users includes the access requester, and
wherein the threshold access level is an expression of how likely the access requester is a legitimate access requester;
means for the access control server selecting a session profile for the access requester based on the threshold access level for the access requester, wherein the session profile indicates one or more actions the access requester is authorized to perform in the network; and
means, based on the session profile, for the access control server authorizing, without accessing one or more external servers to authenticate credentials that are normally handled by the one or more external servers, the access requester to perform one or more actions in the network.

24. The apparatus of claim 23, wherein the means for analyzing the access requester history data includes means for applying one or more threshold filters to the access requester history data to result in determining the threshold access level.

25. The apparatus of claim 23, wherein the session profile is selected by mapping the threshold access level to one or more stored session profiles for the access requester.

26. The apparatus of claim 23, wherein the access requester history data identifies one or more prior unsuccessful access requests from the access requester.

27. The apparatus of claim 23, further comprising:
means for, prior to analyzing the access requester history data, storing the access requester history data, for the access requester, at a client of the access control server.

28. The apparatus of claim 23, further comprising:
means for, prior to analyzing the access requester history data, storing the access requester history data, for the access requester, at the access control server.

29. The apparatus of claim 23, further comprising:
means for, prior to analyzing the access requester history data, storing the access requester history data for the access requester, wherein the access requester history data is imported, and wherein the access requester history data describes activity for the access requester prior to the importation.

30. The apparatus of claim 23, wherein selecting the session profile is performed by a client of the access control server.

31. The apparatus of claim 23, further comprising:
means for requesting the access requester to supply additional authentication or access control information; and
means for analyzing the additional authentication or access control information with the access requester history data to determine the threshold access level.

32. The apparatus of claim 23, further comprising:
means for storing local accounting data that includes information about the session profile assigned to the access requester.

33. The apparatus of claim 23, further comprising:
means for periodically querying the access control server to determine a status of the access control server until the status indicates that the access control server is able to process future access requests; and
in response to determining that the status indicates that the access control server is able to process future access requests, updating the access control server with the local accounting data.

* * * * *

UNITED STATES PATENT AND TRADEMARK OFFICE
CERTIFICATE OF CORRECTION

PATENT NO.        : 7,614,078 B1                                   Page 1 of 1
APPLICATION NO. : 10/406342
DATED             : November 3, 2009
INVENTOR(S)       : Jeremy Stieglitz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this

Nineteenth Day of October, 2010

David J. Kappos
*Director of the United States Patent and Trademark Office*